(12) United States Patent
Suh et al.

(10) Patent No.: US 10,531,497 B2
(45) Date of Patent: Jan. 7, 2020

(54) SYSTEM AND METHOD FOR SPATIAL STREAM ALLOCATION IN UL OFDMA

(71) Applicants: Jung Hoon Suh, Kanata (CA); Osama Aboul-Magd, Kanata (CA); Kwok Shum Au, Ottawa (CA)

(72) Inventors: Jung Hoon Suh, Kanata (CA); Osama Aboul-Magd, Kanata (CA); Kwok Shum Au, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/410,393

(22) Filed: Jan. 19, 2017

(65) Prior Publication Data

US 2017/0303162 A1  Oct. 19, 2017

Related U.S. Application Data

(60) Provisional application No. 62/324,458, filed on Apr. 19, 2016.

(51) Int. Cl.
*H04B 7/0452* (2017.01)
*H04W 74/08* (2009.01)
(Continued)

(52) U.S. Cl.
CPC ........... *H04W 74/085* (2013.01); *H04L 69/22* (2013.01); *H04W 72/0413* (2013.01);
(Continued)

(58) Field of Classification Search
CPC ............. H04W 74/085; H04W 28/044; H04W 72/0413; H04L 69/22
(Continued)

(56) References Cited

U.S. PATENT DOCUMENTS

2013/0208715 A1* 8/2013 Roh ................. H04L 1/0025
370/338
2014/0086131 A1  3/2014 Seok
(Continued)

FOREIGN PATENT DOCUMENTS

CN   103563457 A   2/2014
CN   105120520 A   12/2015

OTHER PUBLICATIONS

International Search Report dated May 25, 2017 for corresponding International Application No. PCT/CN2017/077863 filed Mar. 23, 2017.
(Continued)

*Primary Examiner* — Sai Ming Chan

(57) ABSTRACT

A method for establishing an uplink transmission. A recipient station receives a trigger frame. The trigger frame including at least one per user info field. Each of the at least one per user info field comprising at least a user identifier field identifying a STA to be allocated a resource unit, a resource unit allocation field for allocating a resource unit for the identified STA, and a spatial stream allocation field identifying a number of streams to be allocated for the identified STA. The recipient STA evaluating an order of the at least one per user info fields to determine a sequence of the allocated streams that matches the order of the at least one per user info fields. The recipient STA comparing the values from each of the resource unit allocation fields and grouping corresponding at least one per user info fields with matching values to identify members of a set STAs allocated to MU-MIMO. In some aspects, the spatial stream allocation field of the per user info fields comprises three bits.

15 Claims, 2 Drawing Sheets

(51) Int. Cl.
　　*H04L 29/06*　　　(2006.01)
　　*H04W 72/04*　　　(2009.01)
　　*H04L 27/26*　　　(2006.01)
　　*H04W 84/12*　　　(2009.01)

(52) U.S. Cl.
　　CPC ........ *H04B 7/0452* (2013.01); *H04L 27/2601* (2013.01); *H04W 84/12* (2013.01)

(58) Field of Classification Search
　　USPC ........................................................ 370/201
　　See application file for complete search history.

(56) References Cited

U.S. PATENT DOCUMENTS

2016/0165589 A1* 6/2016 Chu ...................... H04L 5/0007
　　　　　　　　　　　　　　　　　　　　　　　370/329
2017/0201305 A1* 7/2017 Moon ................. H04B 7/0621

OTHER PUBLICATIONS

IEEE P802.11ax™/D0.1, Draft Standard for Information technology—Telecommunications and information exchange between systems Local and metropolitan area networks—Specific requirements, Section 9.3.1.23, Trigger frame format, Mar. 2016.

* cited by examiner

SYSTEM AND METHOD FOR SPATIAL STREAM ALLOCATION IN UL OFDMA

FIELD OF THE INVENTION

The present invention pertains to the field of communication networks and in particular to a system and method for stations (STAs) to communicate over a communication network. In an aspect the present invention more particularly relates to a system and method for allocating streams for an uplink communication service period.

BACKGROUND

In communication networks, and in particular wireless communication networks, coordination is required between communicating devices. The coordination is managed by a network controller which sets the parameters for each device to use to avoid communication collisions or cross-talk.

In a downlink (DL) transmission the access point (AP) is both the data originator and network controller. Accordingly, the AP has control over the communication as it is both the controller and the point of transmission to listening STAs.

In an uplink (UL) transmission, however, the AP only acts as the network controller and the STAs are the data originators. In order to coordinate the STAs transmissions, the IEEE 802.11ax draft standard proposes that the AP may exercise UL control via the use of trigger frames that are sent to STAs. Upon receipt, each STA may process a received trigger frame to obtain the communication protocol to be followed. That STA may then apply the protocol when transmitting data to the AP, or in some cases to other STAs.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the development of next generation wireless local-area networks (WLAN), there is additional flexibility in handling the identity of connected devices, as well as for providing new modes of connectivity for non-connected devices.

In accordance with an aspect of the present invention, there is provided a network for exchanging data over a communication network.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE INVENTION

The present application relates to a system and method for providing connectivity to a network. In particular, the present application relates to a system and method for triggering a connectivity service period and to allocate resources for that service period. In further particularity, the present application relates to a system and method for specifying a spatial stream allocation The present application relates to a mechanism for a sender, or "Access Point (AP)", to efficiently communicate to a recipient device (recipient STA) a protocol for conducting an uplink communication. In particular, the present application relates to a mechanism for an AP to efficiently select between a Single User Multiple Input Multiple Output (SU-MIMO) channel and a Multiple User Multiple Input Multiple Output (MU-MIMO) channel and in both cases to indicate a number of streams for each user. In the case of the MU-MIMO channel, the AP is further able to indicate a sequence of streams to the recipient STA in order to establish the uplink channel efficiently.

As would be readily appreciated by a worker skilled in the art, the present mechanism for communicating a protocol for conducting an uplink communication is suitable for SU/MU-MIMO scheduled on top of Orthogonal Frequency-Division Multiple Access (OFDMA) scheduling. For example, MU-MIMO may be scheduled on top of OFDMA scheduling, and both MU-MIMO and OFDMA require a protocol for conducting the uplink communication, irrespective of whether they are scheduled together or alone.

In a typical implementation each of the AP and the recipient STA comprise computing devices having at least one processor and memory. The at least one processor and memory operative to execute program code for generating the frame and fields described below. The AP further including a transmitter for transmitting the frame to the recipient STA. Each recipient STA further including a receiver for receiving the transmitted frame. The recipient STAs operative to process the received frame in order to identify parameters of the uplink transmission triggered by the AP.

Figure 1:
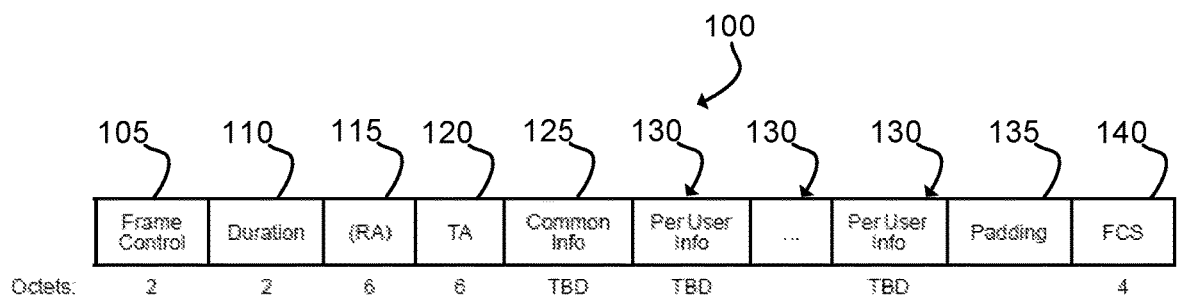
FIG. 1 illustrates a trigger frame format.

FIG. 1 illustrates a trigger frame 100 in a format as currently defined in the draft IEEE 802.11ax standard. The trigger frame 100 is used to allocate resources for uplink (UL) multiuser (MU) transmission, and to solicit an UL MU transmission at a specified interframe spacing (IFS) after the physical layer protocol data unit (PPDU) that carries the trigger frame 100, as well as other information required for a responding device to send an UL MU transmission.

The trigger frame 100 is generated by an AP and transmitted to a recipient STA. The recipient STA reading the trigger frame 100 to determine a type of transmission (SU or MU-MIMO), and if a MU-MIMO transmission, an identity of the users as well as an order of their streams in the transmission, among other information required for the communication.

Multiple User (MU) transmission includes both OFDMA and/or MU-MIMO. Single User (SU) transmission is not limited to SU-MIMO, but rather, it means the transmission is only targeted to one user. One user UL transmission, that is, UL-SU transmission, does not require a trigger frame because it is targeted for only one recipient, however, sending a trigger frame can be beneficial with UL-SU with one RU allocation.

As indicated, the trigger frame 100 currently includes a number of defined fields, as well as a number of fields that remain to be defined. Additional fields not currently illustrated may also be included when the format is finalised. The current trigger frame 100 includes a frame control field 105, a duration field 110, a Receiver Address (RA) field 115, a Transmitter Address (TA) field 120, a common info field 125, a plurality of per user info fields 130 (one for each user), a padding field 135, and a Frame Check Sequence (FCS) field 140.

Figure 2:
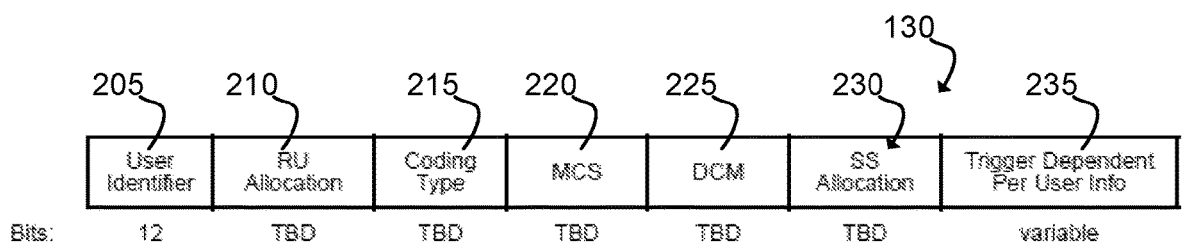
FIG. 2 illustrates a per user info field for the trigger frame format of FIG. 1.

FIG. 2 illustrates an embodiment of a format for the per user info fields 130 indicated in FIG. 1, as currently defined in the IEEE 802.11ax standard. The per user info fields 130 of FIG. 2 each include a user identifier field 205, a Resource Unit (RU) allocation field 210, a coding type field 215, a Modulation and Coding Set (MCS) field 220, a Dual Carrier Modulation (DCM) field 225, a Spatial Stream (SS) allocation field 230, and a trigger dependent per user info field 235.

The user identifier field 205 indicates the association identifier (AID) of the STA to be allocated an RU in the current per user info field 130. The RU allocation field 210 indicates the RU(s) allocated to the STA identified in the user identifier field 205.

The SS allocation field 230 is intended to indicate the spatial streams of the High Efficiency (HE) trigger-based PPDU response of the STA identified by the user identifier field 205 in that per user info field 130. It has been proposed that the SS allocation field 230 represent the number of allocated streams for both the SU-MIMO case as well as the MU-MIMO case. In the case of MU-MIMO, the SS allocation field 230 will further indicate the order of the streams. The format of the SS allocation field 230 has not yet been further defined by the IEEE 802.11ax standard.

The present application proposes a format for the SS allocation field 230 included in each per user info field 130. In a first aspect, the present application provides for the SS allocation field 230 having a constant size such that the number of bits in the SS allocation field 230 is equal for both a SU-MIMO allocation and for a MU-MIMO allocation. A constant size for the SS allocation field 230 conveniently provides a constant byte length for the per user info field 130 regardless of whether the SS allocation field 230 is indicating a SU-MIMO or MU-MIMO allocation.

Figure 3:
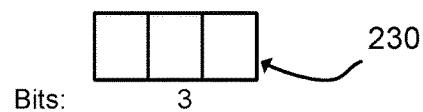
FIG. 3 illustrates an SS allocation field of the per user info field of FIG. 2.

In a second aspect, the maximum number of streams to allocate per STA for SU-MIMO is 8 streams. The maximum number of allocated streams per STA for MU-MIMO is 4 streams. Thus, a minimum number of required bits to indicate the number of allocated streams for SU-MIMO is 3 bits and for MU-MIMO is 2 bits. Referring to FIG. 3, in an implementation, the first and second aspect may be combined, and a constant 3 bits may be assigned to the SS allocation field 230. This arrangement allows for constant size per user info fields 130, with only minimal additional space for the redundant extra bit in the case of MU-MIMO.

In a third aspect, there is a need to identify whether the STA identified in the user identifier field 205 is to be allocated as an SU-MIMO or MU-MIMO. One option would be to allocate additional bits in the SS allocation field 230 to indicate whether the STA identified in the user identifier field 205 is to be allocated as a SU-MIMO or MU-MIMO. The present application provides for eliminating the need to assign designated bits to identity SU-MIMO or MU-MIMO. Instead, the recipient STA may determine the allocation by evaluating the RU allocation field 210 for all of the per user info fields 130. The recipient STA may group STA(s) based upon the indicated RU in the RU allocation field 210. Where more than one STA is allocated to the same RU, then all of the STA(s) with the common RU belong to a group of MU-MIMO STAs, and the recipient STA may flag or identify their corresponding per user info fields 130 as being allocated to MU-MIMO scheduling. Where an STA has a unique RU (or a unique set of RU depending upon the case) allocated to it by the RU allocation field 210, then that recipient STA may flag or identify that STA as being allocated to SU-MIMO scheduling.

In a fourth aspect, as indicated above the SS allocation field 230 is intended to indicate the spatial streams of the High Efficiency (HE) trigger-based PPDU response of the STA identified by the user identifier field 205 in that per user info field 130. In the case of MU-MIMO, an order of the streams for scheduling also needs to be indicated. In order to minimize a length of the SS allocation field 230, and accordingly each of the per user info fields 130 making up the trigger frame 100, the present application provides for not including this information in the SS allocation field 230. Instead, the present application proposes indicating the stream ordering by a sequence order of the per user info fields 130 having the same RU in the RU Allocation field 210 within the trigger frame 100. Accordingly, a recipient STA may determine its own position in the sequence of the allocated streams by evaluating the trigger frame 100 and in particular the recipient STA's position within the relative order of the user identifier fields 205 in the per user info fields 130 having the same RU in the RU Allocation field 210 within the trigger frame 100. Conforming the stream order with the order of the per user info fields 130 within the trigger frame obviates the need for assigning extra bits to indicate the order of the streams for MU-MIMO. This conforming is further advantageous as the trigger frame 100 is intended to be used for both SU-MIMO and MU-MIMO communications. Eliminating the need for assigning extra bits that are only relevant MU-MIMO avoids the inefficiency of allocating additional bits that are irrelevant for SU-MIMO communication.

Figure 4:
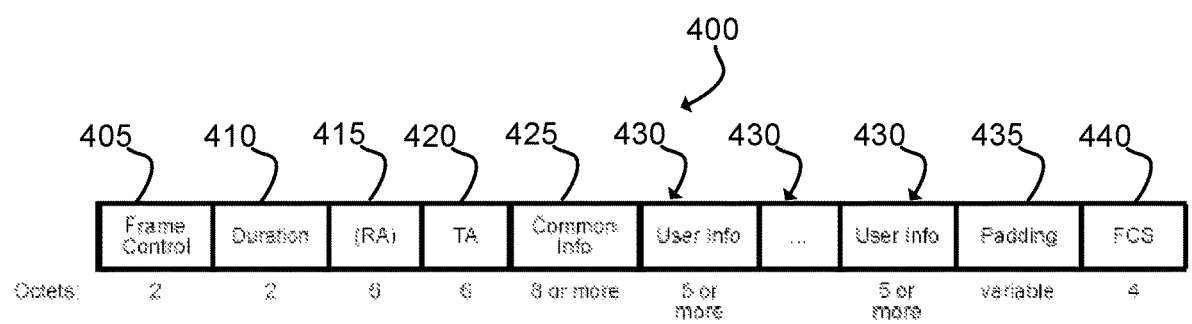
FIG. 4 illustrates a trigger frame format according to one embodiment.

FIG. 4 illustrates a trigger frame 400 in a format as currently defined in the draft IEEE 802.11ax standard. As described above trigger frame 400 is used to allocate resources for uplink (UL) multiuser (MU) transmission, and to solicit an UL MU transmission at a specified interframe spacing (IFS) after the physical layer protocol data unit (PPDU) that carries the trigger frame 400, as well as other information required for a responding device to send an UL MU transmission.

As also described above in relation to FIG. 1, the trigger frame 400 is generated by an AP and transmitted to a recipient STA. The recipient STA reading the trigger frame 400 to determine a type of transmission (SU or MU-MIMO), and if a MU-MIMO transmission, an identity of the users as well as an order of their streams in the transmission, among other information required for the communication.

As illustrated in FIG. 4, the trigger frame 400 currently includes a number of defined fields. Additional fields not currently illustrated may also be included when the format is finalised. The current trigger frame 400 includes a frame control field 405, a duration field 410, a Receiver Address (RA) field 415, a Transmitter Address (TA) field 420, a common info field 425, a plurality of per user info fields 430 (one for each user), a padding field 435, and a Frame Check Sequence (FCS) field 440.

Figure 5:
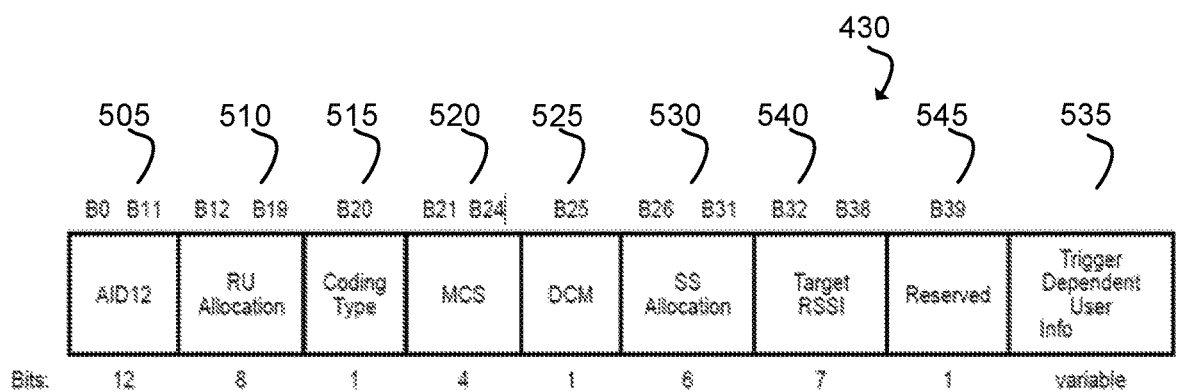
FIG. 5 illustrates another per user info field for the trigger frame format of FIG. 4.

FIG. 5 illustrates an embodiment of a format for each per user info field 430, as currently defined in the IEEE 802.11ax standard. The per user info fields 430 of FIG. 4 each include a AID12 field 505 (which is an example of an user identifier field), a Resource Unit (RU) allocation field 510, a coding type field 515, a Modulation and Coding Set (MCS) field 520, a Dual Carrier Modulation (DCM) field 525, a Spatial Stream (SS) allocation field 530, a target Received Signal Strength Indication (RSSI) field 540 (which represents the strength of the received signal), a reserved field 545 and a trigger dependent per user info field 535. As illustrated in FIG. 4, in this embodiment, bits have been assigned to the fields within each per user info field 130, with the SS allocation field 530 being assigned 6 bits. In this embodiment, the first 3 bits of the 6 bit SS allocation represents the number of streams and remaining three bits represents the beginning stream. For example, the STA corresponding to the AID12 field is scheduled with 2 streams indicated by the first 3 bits, and the beginning stream is the third stream indicated by the remaining three bits, then the STA of the AID12 field is scheduled over the third and fourth streams. However, as described above, one aspect of the present application is to reduce the SS allocation to a constant 3 bits, which allows for a constant size per user info fields 130. Accordingly, in one embodiment, and redefining the currently defined IEEE 802.11 ax standard, SS field 530 of the info field 430 depicted in FIG. 5, is assigned 3 bits.

Unless defined otherwise, all technical and scientific terms used herein have the same meaning as commonly understood by one of ordinary skill in the art to which this invention belongs.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A method for establishing an uplink transmission for at least one Station (STA):
   receiving a trigger frame at one first STA of the at least one STA;
   the trigger frame including at least one per user info field;
   each of the at least one per user info field comprising at least:
      a user identifier field identifying a second STA to be allocated to a resource unit,
      a resource unit allocation field for identifying the allocated resource unit, and
      a spatial stream allocation field identifying a number of streams to be allocated for the second STA;
   wherein the spatial stream allocation field is a constant length for SU-MIMO communications, and wherein the spatial stream allocation field is the same constant length for MU-MIMO communication.

2. The method of claim 1 wherein the first STA is the second STA.

3. The method of claim 1 wherein the trigger frame includes at least one of a frame control field, a duration field, a Receiver Address (RA) field, a Transmitter Address (TA) field, a common info field, a padding field, and a Frame Check Sequence (FCS) field.

4. The method of claim 1 wherein per user info field comprises at least one of a coding type field, a Modulation and Coding Set (MCS) field, a Dual Carrier Modulation (DCM) field, and a trigger dependent per user info field.

5. The method of claim 1, wherein the spatial stream allocation field comprises three bits.

6. A method for establishing an uplink transmission for at least one Station (STA):
   receiving a trigger frame at one first STA of the at least one STA;
   the trigger frame including at least two per user info fields;
   a first per user info field comprising at least:
      a user identifier field identifying the first STA to be allocated to a resource unit,
      a resource unit allocation field for identifying the allocated resource unit, and
      a spatial stream allocation field identifying a number of streams to be allocated for the first STA; and
   a second per user info field comprising at least:
      a user identifier field identifying a second STA to be allocated to the allocated resource unit,
      a resource unit allocation field for identifying the allocated resource unit, and
      a spatial stream allocation field identifying a number of streams to be allocated for the second STA; and
   joining, by the first STA, a group of MU-MIMO stations (STAs);
   wherein the spatial stream allocation field is a constant length for SU-MIMO communications, and wherein the spatial stream allocation field is the same constant length for MU-MIMO communication.

7. The method of claim 6 wherein the first STA is the second STA.

8. The method of claim 6 wherein the trigger frame includes at least one of a frame control field, a duration field, a Receiver Address (RA) field, a Transmitter Address (TA) field, a common info field, a padding field, and a Frame Check Sequence (FCS) field.

9. The method of claim 6 wherein per user info field comprises at least one of a coding type field, a Modulation and Coding Set (MCS) field, a Dual Carrier Modulation (DCM) field, and a trigger dependent per user info field.

10. The method of claim 6, wherein the spatial stream allocation field comprises three bits.

11. A method for establishing an uplink transmission for at least one Station (STA):
   receiving a trigger frame at one first STA of the at least one STA;
   the trigger frame including at least two per user info fields;
   a first per user info field comprising at least:
      a user identifier field identifying the first STA to be allocated to a resource unit (RU),
      a RU allocation field for identifying the allocated RU, and
      a spatial stream allocation field identifying a number of streams to be allocated for the first STA; and
   a second per user info field comprising at least:
      a user identifier field identifying a second STA to be allocated to the allocated RU,
      a RU allocation field for identifying the allocated RU, and
      a spatial stream allocation field identifying a number of streams to be allocated for the second STA; and
   wherein subsequent STA stream order for said RU conforms to the order of the STAs identified in the first and second per user info fields;
   wherein the spatial stream allocation field is a constant length for SU-MIMO communications, and wherein the spatial stream allocation field is the same constant length for MU-MIMO communication.

12. The method of claim 11 wherein the first STA is the second STA.

13. The method of claim 11 wherein the trigger frame includes at least one of a frame control field, a duration field, a Receiver Address (RA) field, a Transmitter Address (TA) field, a common info field, a padding field, and a Frame Check Sequence (FCS) field.

14. The method of claim 11 wherein per user info field comprises at least one of a coding type field, a Modulation and Coding Set (MCS) field, a Dual Carrier Modulation (DCM) field, and a trigger dependent per user info field.

15. The method of claim 11, wherein the spatial stream allocation field comprises three bits.

\* \* \* \* \*